Oct. 14, 1930. H. L. MAHER ET AL 1,778,640
ELECTRICAL GENERATOR FOR WELDING OR THE LIKE
Filed Feb. 23. 1928
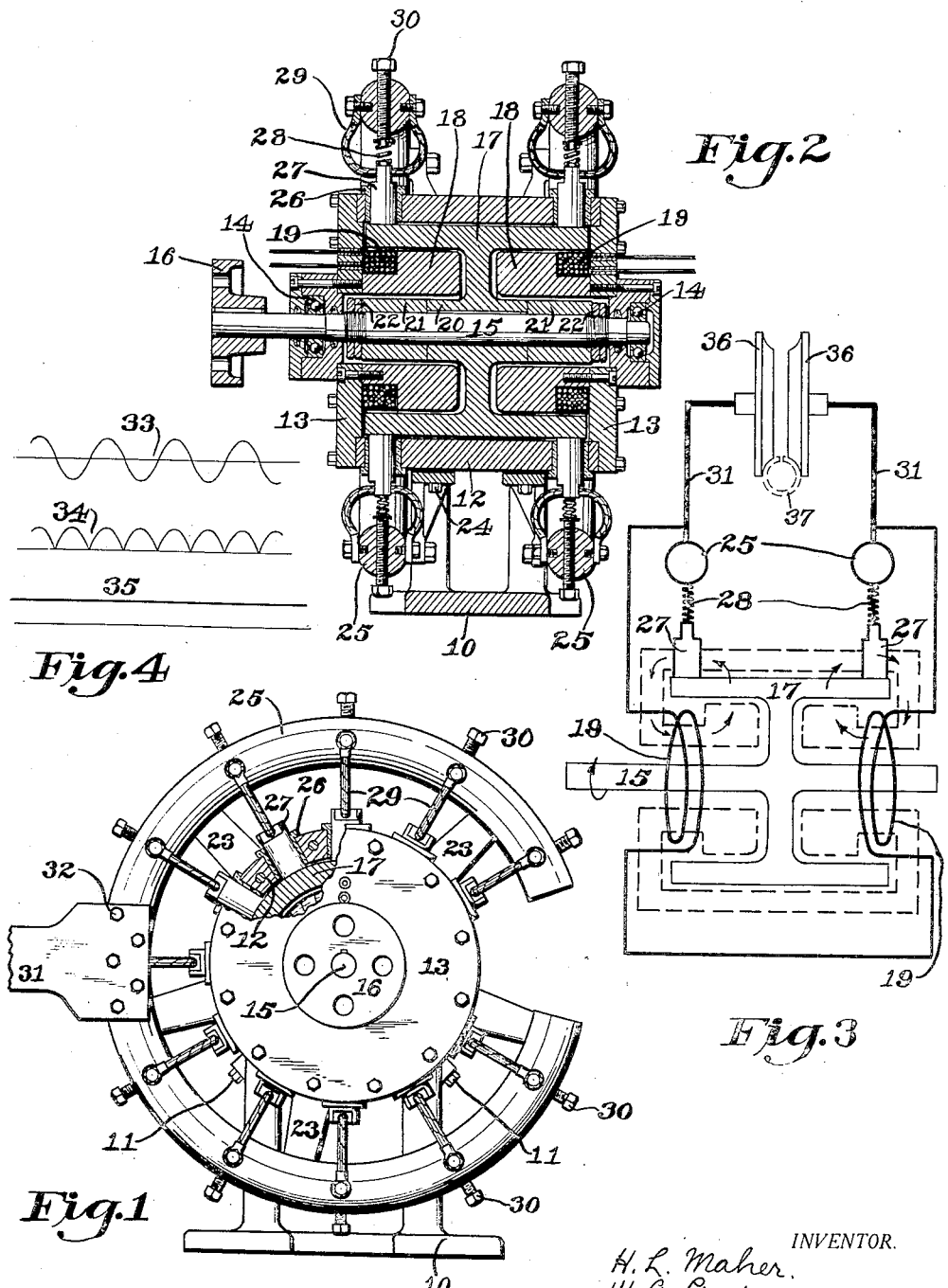
INVENTOR.
H. L. Maher.
W. A. Andrews.
BY
C. R. Halbert.
E. L. Davis.
ATTORNEYS.

Patented Oct. 14, 1930

1,778,640

UNITED STATES PATENT OFFICE

HARRY L. MAHER AND WILLIAM A. ANDREWS, OF DETROIT, MICHIGAN, ASSIGNORS TO FORD MOTOR COMPANY, OF HIGHLAND PARK, MICHIGAN, A CORPORATION OF DELAWARE

ELECTRICAL GENERATOR FOR WELDING OR THE LIKE

Application filed February 23, 1928. Serial No. 256,171.

The object of our invention is to provide a machine and method of welding in which the machine may be of simple, durable, and inexpensive construction and the method may be advantageous and cheap.

Still a further object of our invention is to provide an improved type of generator for use in connection with welding.

In connection with electric welding in the past, numerous attempts have been made to obtain quickly and economically on a production basis a joint between sheet metal edges which is permanent and liquid tight. The earliest form of said welding with which we were familiar is disclosed in the Parpart Patent 658,741 which was used for a number of years with some degree of satisfaction but eventually was discarded as being slower and more expensive than the methods shown in the Johnson Patent 1,388,434. In this latter patent the welding is accomplished with a sixty cycle current and the speed is three or more times as great as that of the Parpart welding and the burr is much reduced. This latter patent has the disadvantage, if the speed is too great, of not forming a liquid tight weld because the alternations or cycles of the current cause successively recurring places which are not completely welded if welded at all. If the speed is sufficiently increased with the Johnson method, then there are relatively long areas of each seam which are not welded at all so that the speed under this process is necessarily limited and the welded seam formed is not perfect.

Following this Johnson disclosure, an attempt was made to remedy the defects of the Johnson weld by a process such as is disclosed in the Pancoast Patent 1,544,272. This patent alleges that it solves the difficulties herein before mentioned with the Parpart and Johnson disclosures but so far as we are informed no successful commercial use has ever been made of this Pancoast process and probably none can be made because of the difficulty of making a machine which will give a welding current of the high frequency mentioned in the Pancoast patent and because such current would probably not be satisfactory for making a seam weld even if it could be generated.

We propose to secure a substantially perfectly welded seam by using direct current which will enable us to secure a substantially perfect welded seam at any desired speed. If welding of the seam type is to be done by what is termed a continuous process, it will no doubt be undestood that there are three variables which must be controlled and balanced in order to secure a perfect weld. These three variables are speed, weld area, and current density. It will readily be seen that if these elements are not kept in substantial balance the character of weld will be either toward burning the material of the joint or toward failing to secure a weld at all. It is the object of our invention to provide a device in which these three variables may be balanced with each other so a substantially perfect seam weld may be secured.

In connection with the use of alternating current it is well known that this current runs in cycles which run from a peak in one direction to a peak in the opposite direction with neutral points in each cycle at which there is no current going through the work. When direct current is generated in a generator with a commutator, the effect is the same as the commutator operates to rectify the alternating current produced by the generator so that a succession of impulses in the same direction through the wires is secured which alternate with periods when no current passes. In our improved device a true direct continuous current is used for welding so that the weld secured is of uniform character throughout its length.

With these and other objects in view, our invention consists in the arrangement, combination, and construction of the various parts of our improved device and the method of using the same as described in the specification, claimed in the claim, and illustrated in the accompanying drawings, in which:

Figure 1 shows an end elevation of our improved generator.

Figure 2 shows a vertical longitudinal sectional central view through our improved generator.

Figure 3 shows a diagrammatic illustration of our generator used for welding and, Figure 4 shows a diagrammatic view of the current impulses received from alternating, commutated direct, and continuous direct current.

Referring to the accompanying drawings, we have used the reference numeral 10 to indicate generally the base upon which our improved continuous direct current generator is mounted. Secured to said base in any suitable way as by cap screws 11 is a hollow open end iron cylinder 12. The ends of said cylinder 12 are closed by circular iron disks 13 which have bearings 14 mounted therein to support the generator driveshaft 15. A generator driving coupling 16 is fixed to one end of the generator driveshaft 15. A spool shaped cast iron armature is splined to the generator shaft 15 intermediate of the ends thereof and the periphery of the armature 17 extends into close proximity to the inner periphery of the cylinder 12. In other words there is just a running clearance between these two peripheries. Coil carrying rings 18 are secured to the inner surfaces of the disks 13 within the channels formed at each end of the spool shaped armature 17, there being just a running clearance between the surfaces of the rings 18 and the adjacent surfaces of the armature 17. Ring shaped field coils 19 are wound in annular channels formed by cutting away a portion of the rings 18 adjacent to the disks 13, these field coils 19 being shaped so that they come as close to the armatures 17 as possible and still leave a running clearance, and so that they are disposed adjacent to the ends of this spool shaped armature.

It may be mentioned that the armature 17 is made in three parts to facilitate machining, the inner web of the spool shaped armature being formed from the integral sleeve portion 20 which is separate from the two non-integral sleeves 21 clamped thereto by the nuts 22. These nuts 22 are at each end of the armature 17 and are threaded to the generator drive shaft 15 so as to further permit the adjustment of the longitudinal position of the armature 17 on the shaft 15 so that the armature may be properly positioned relative to the shell of the generator.

Insulated brackets 23 are secured to the cylinder 12 by screws 24 whereby the brush supporting ring 25 may be mounted on the cylinder 12. A plurality of openings are formed in the periphery of the cylinder 12 adjacent to each end thereof and in substantially radial alignment with the field coils 19 and each of these openings is provided with an insulating sleeve 26. A copper brush 27 is slidably mounted in each of these sleeves 26 and is yieldingly urged into engagement with the armature 17 by the springs 28 which have one end bearing against the adjacent brush 27. Each brush 27 is further connected to the ring 25 by a pair of flexible cables 29. A screw 30 is threaded through the brush ring 25 and bears against the inner end of the spring 28 whereby the pressure of the spring 28 forcing the brush 27 against the armature 17 may be adjusted. The brush ring 25 does not extend entirely around the cylinder 12 as will be noted by referring to Figure 1. In other words this brush ring is broken at one side and a current carrying lead 31 is secured to the other side thereof by means of screws 32.

This break in the brush ring 25 is one of the important features of our invention as this prevents a pyramiding of the current picked up by the brush ring which would tend to raise the voltage which in turn would cause unsatisfactory and irregular welding. In other words this broken brush ring 25 which has the lead taken off at the opposite end thereof enables us to secure a substantially constant welding current such as is necessary in connection with seam welding.

Referring to Figure 3, it will be seen that we have diagrammatically there illustrated the use of our machine and process for welding. In this view the leads 31 are connected to roll electrodes 36 which weld the seam in the tube 37.

Referring to Figure 4, it will be noted that there is very diagrammatically illustrated at 33, 34 and 35 the current secured from an A. C. generator, a commutator D. C. generator, and a uniform output continuous D. C. generator, respectively. From these diagrams it will be seen that with either A. C. or commutated D. C. current, the current runs from a maximum or peak through a minimum of no current. On the other hand with a true continuous direct current, a continuous desired current may be used for the welding and a consequently continuous regular weld may be secured by this current. This is very graphically illustrated by the diagrammatic lines 35.

The various advantages of our improved method and device have been brought out in the course of the specification and it may be well to repeat that by our improved continuous direct current generator we are enabled to secure a homogeneous, continuous, uniform weld, substantially without flash, at any desired speed, which is of relatively great strength and liquid proof. For instance this weld is perfectly satisfactory for welding the seams of a gasoline tank whereas the weld which would be secured by current such as is illustrated in the graph lines 33 or 34 in Figure 4 would be unsatisfactory unless the weld was made so slowly that it would be too expensive.

Still a further advantage results from the use of our improved continuous current generator in that we are enabled to secure by the efficient correctly designed structure used, a constant voltage constant amperage current, when the generator is run at a constant speed.

Some changes may be made in the arrangement and construction of the various parts of our improved device without departing from the spirit of our invention and it is our intention to cover by our claim such changes as may reasonably be included within the scope thereof.

We claim as our invention:

In a unipolar generator, a stator comprising an outer cylindrical casing and end pieces secured thereto, a pair of annular members secured to said end pieces and projecting into the interior of said casing in spaced relationship to the interior thereof to define a pair of large annular gaps, one at each end of said generator, field coils mounted within said annular members, a one piece rotor having a pair of annular webs extending into said gaps, a set of brushes passing through said casing at each end thereof and contacting with said webs, an interrupted collector ring at each end of said generator with which each set of brushes are connected in parallel, and a connecting lead from substantially the center of each ring.

January 7th, 1928.

HARRY L. MAHER.
WILLIAM A. ANDREWS.